Patented Mar. 16, 1954

2,672,470

UNITED STATES PATENT OFFICE 2,672,470

PREPARATION OF THE HIGHER MONOACYL-AMIDES FROM MONOAMIDES AND ACID HALIDES

Otto Turinsky, Western Springs, and Richard A. Reck, Chicago, Ill., assignors to Armour and Company, Chicago, Ill., a corporation of Illinois No Drawing. Application February 24, 1948, Serial No. 10,584

5 Claims. (Cl. 260—404)

This invention relates to the preparation of the higher monoacylamides from monoamides and acid halides. One phase of the invention is the production of a high molecular weight diamide of the general formula

in which $R_m$ and $R_n$ may or may not be the same and in which the $R_m$ or both of the radicals contain at least 12 carbon atoms.

This application constitutes a continuation-in-part of our copending application Serial No. 678,680 filed June 22, 1946, now abandoned.

Prior processes suggested for the forming of low molecular weight diamides have been unsatisfactory, either because of low yields, difficulty in preparing certain of the reagents, or because of general commercial infeasibility. No satisfactory process has been developed in which quantitative or substantially quantitative yields are obtained while using ordinary and readily available reagents. Further, it has not heretofore been possible to produce a high molecular weight diamide, although in recent years a claim has been made for the production of a distearamide. Examination of the process and the product reveals that the author was mistaken and that the product actually was a stearonitrile.

An object of the present invention is to produce a new composition of matter in the form of a monoacylamide of high molecular weight having new and valuable properties. A further object is to provide a process which employs readily available and inexpensive reagents and by which we may obtain substantially quantitative yields in the production of both low molecular and high molecular diamides. Other specific objects and advantages will appear as the specification proceeds.

Generally, our new method comprises the heating together of equal molecular quantities of amide and acid halide, preferably in the absence of solvents, and under conditions which provide for the rapid removal of the hydrogen chloride formed during the reaction. The reaction is illustrated by the following equation:

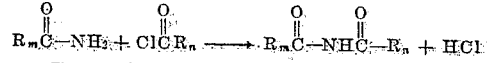

where $R_m$ and $R_n$ may or may not be the same, may be saturated or unsaturated, may be open chain or cyclic, and may be unsubstituted or substituted by groups inert to the acid chloride or to any other acid halide employed.

In the carrying out of our process, we prefer to maintain the reacting materials under reduced pressure or vacuum, the degree of the vacuum being such as to remove the hydrogen chloride rapidly so that secondary reactions are prevented. Further, the reduced pressure or vacuum removes air which is undesirable as tending to cause a darkening of the product. Yet another advantage of the vacuum is that the operation can be carried on at low temperature which further minimizes the danger of secondary reactions. We prefer to employ mechanical agitation during the reaction in order to further enhance the removal of the hydrogen chloride.

The starting material may be any monoamide or any mixture of monoamides, such as, for example, a mixture of stearo, palmitic and oleic amides. The starting material may be a commercial mixture of monoamides and may be a relatively impure mixture. Depending upon the mixture of amides, temperature and other conditions may be varied to give the best results.

Any suitable temperatures may be used. Ordinarily, a temperature slightly above the normal melting point of the amide may be used, such as, for example, 100° C. The range of 100° C. to 140° C. and above has ordinarily been satisfactory, but it will be understood that considerable variation in temperature may be desired by reason of the changing of other conditions, such as the degree of vacuum, nature of reactants, etc.

With purified starting materials, yields of monoacylamides are obtained which are practically quantitative, while the yields from the commercial grades of starting materials are also very high, ranging but a few percent under the calculated amount. The high molecular monoacylamide obtained is a waxy product which is much less soluble than the monoamide in polar solvents. It is valuable for use in textile treating materials and for many other uses. The best high molecular product is obtained when the starting amide material has a carbon length between $C_{12}$ and $C_{22}$.

The degree of vacuum which is necessary in the preferred process will vary not only for the particular starting material and other conditions but also it will vary during the reaction operation, a greater vacuum being required at one time than at another due to the great evolution of hydrogen chloride. Generally, a vacuum of from 1 to 100 mm. of mercury is operable.

Any acid halide may be employed, as has already been indicated, but the acid chloride is greatly preferred because of its unusual effectiveness in the operation and because it results in a superior product.

Examples of the process may be set out as follows:

*Example 1.*—A mixture of 0.066 mole (18.7 grams) of recrystallized stearamide and 0.066 mole (19.9 grams) of vacuum distilled steroyl chloride was heated under vacuum (10 mm.) in an oil bath. Appreciable bubbling (due to the evolution of HCl) did not take place until the temperature reached 100–105° C. The temperature was held at 105–110° C. for 1½ hours, the rate of HCl evolution diminishing rapidly at this stage. The heating was continued for another 3 hours with the temperature reaching a maximum value of 140° C. By this time the evolution of HCl has ceased. Weighings showed that a theoretical amount of HCl had been evolved and that the yield of crude distearamide (36.2 grams melting at 90–95° C.) was practically quantitative. The distearamide in contrast with stearamide was found to be quite insoluble in hot 95% ethanol but readily soluble in chloroform and carbon tetrachloride. On recrystallization from carbon tetrachloride there was obtained a yield of 30.8 grams (85% of the total) melting point 105–106° C. Analysis showed 2.60% nitrogen (the calculated value is 2.55%).

*Example 2.*—Lauric-myristic amide was prepared from 0.1 mole of recrystallized lauric amide and 0.1 mole of re-distilled myristoyl chloride according to the procedure given under Example 1. Again the yield obtained was nearly quantitative. The melting point of the recrystallized product was 93.0–93.5° C. Analysis showed 3.50% nitrogen (the calculated value is 3.42%).

*Example 3.*—Dilauramide was prepared from ½ mole (99.6 grams) of lauric amide and ½ mole (110 grams) of lauroyl chloride according to the procedure given under Example 1, except for the fact that the pressure was maintained at 93–111 mm. pressure and the total heating time was reduced to 1¼ hours. The reaction appeared to be quite complete since the evolution of HCl became negligible toward the end of this heating period. The recrystallized dilauramide had a melting point of 97–98° C. Analysis showed 3.62% nitrogen (the calculated value is 3.67%).

*Example 4.*—Roughly ¼ mole (75.5 grams) of commercial stearoyl chloride was heated with an oil bath at 85–95° C. under a vacuum (20–65 mm. pressure) with agitation for about ½ hour in order to remove volatile chlorine compounds. To this was then added 71 grams (roughly ¼ mole) of commercial stearamide and the vacuum heating with occasional agitation (50–70 mm. pressure) was resumed. The reaction temperature was held at 100–115° C. for 1 hour being allowed to rise slowly to a maximum of 135° C. toward the end of 2½ hours making the total heating time 3½ hours. The crude distearamide thus obtained (melting point 85–88° C.) was practically of the same color as the original stearamide.

*Example 5.*—A 100 pound quantity of commercial distearamide was prepared according to the procedure given in Example 4. The product was found to be a little superior (melting point 88–90° C.) to that described in Example 4.

*Example 6.*—One mol. of commercial stearic acid was treated with phosphorous trichloride and carbon tetrachloride in the usual manner. The residue can be assumed to be 85–90% stearoyl chloride. To this was added .9 mol. of stearamide and the mixture heated at 100° to 120° C. for three hours under water pump vacuum. The product was allowed to cool and was then washed with 200 cc. of warm 3A alcohol. The residue melted at 103° to 105° after filtration, and weighed 430 g., indicating a yield of 80%, starting from stearic acid. The yield is actually near quantitative when the yield of intermediate reactions and purity of compounds are considered.

The product is a crystalline wax-like material of very light color. The melting point of 103° to 105° compares favorably with the highly purified sample which has a melting point of 110°. In a cake the material readily crumbles to a fine powder.

An inert gas was used instead of vacuum, but was found to be unsatisfactory because the product was dark in color and low in yield as a result of more side reactions. By using vacuum, we were able to maintain low temperatures, well below 140° C., and as a result a much superior product was obtained. With vacuum, the temperatures may be maintained for the most part in the range of 100–120° C. with excellent results, as indicated in the above examples. When using an inert gas, the temperatures were higher and more commonly in the neighborhood of 140° C. and above. As an example of the process using inert gas, the following may be set out:

A mixture of 75.6 g. (¼ mole) of stearoyl chloride and 7.08 g. (¼ mole) of stearamide was carefully heated in an oil bath. During the entire heating time the reaction mixture was agitated mechanically while a moderate stream of nitrogen bubbled through.

The total heating time was 2 hours during which the temperature was allowed to rise from 125° C. to 135° C. being at the latter value for the greater portion of the time. The yield of partly purified distearamide (melting point 95–98° C.) was 39 grams or 28½% of the theoretical yield.

The use of vacuum in the process, as indicated by the above examples, sharply improves the yield, while at the same time resulting in a light-colored product. The use of vacuum instead of inert gas removes the HCl at such an increased rate that the main side reactions, namely, that of the formation of nitrile and fatty acid are practically eliminated. By quickly removing the hydrogen chloride as it is evolved, while also employing a relatively low range of temperatures, an unusually fine product is obtained and with a yield which approaches a quantitative yield.

The aliphatic monoamide treated by the process is preferably one having from 12 to 18 carbon atoms, as indicated by the examples set out. It will be understood, however, that the process is applicable to higher molecular weight monoamides.

While in the foregoing specification, we have set forth the details of various steps which may be employed in the carrying out of the process, it will be understood that such details may be varied widely by those skilled in the art without departing from the spirit of our invention.

We claim:

1. In a process for the preparation of monoacylamides, the steps of heating an aliphatic monoamide having from 12 to 18 carbon atoms and a higher fatty acid halide at a temperature of about 100–140° C. while maintaining the reacting materials under reduced pressure, said pressure being sufficiently low to remove substantially all of the hydrogen halide as formed.

2. In a process for the preparation of monoacylamides, the steps of heating an aliphatic monoamide having from 12 to 18 carbon atoms and a higher fatty acid halide at a temperature of about 100–140° C. and agitating the reacting mixture under reduced pressure, said pressure being sufficiently low to remove substantially all of the hydrogen halide as formed.

3. In a process for the preparation of monoacylamides, the steps of heating an aliphatic monoamide having from 12 to 18 carbon atoms and a higher fatty acid chloride at a temperature of about 100–140° C., agitating the materials, and maintaining the materials at a pressure of about 1–100 mm. to remove the evolved hydrogen chloride.

4. In a process for the preparation of monoacylamides, the steps of heating a mixture consisting of an aliphatic monoamide having from 12 to 18 carbon atoms and a higher fatty acid chloride, in equal molar quantities, at a temperature of about 100–140° C., and maintaining the reacting materials under reduced pressure of the order of 1–100 mm. to remove the evolved hydrogen chloride.

5. In a process for the preparation of monoacylamides, the steps of heating an aliphatic monoamide having from 12 to 18 carbon atoms and a higher fatty acid chloride at a temperature of about 100–120° C. while maintaining the reacting materials under reduced pressure of the order of 1–100 mm. to remove the evolved hydrogen chloride.

OTTO TURINSKY.
RICHARD A. RECK.

References Cited in the file of this patent

UNITED STATES PATENTS

| Number | Name | Date |
|---|---|---|
| 2,090,595 | Jacobson | Aug. 17, 1937 |
| 2,388,132 | Fischer et al. | Oct. 30, 1945 |